(12) United States Patent
Dunn et al.

(10) Patent No.: US 7,374,348 B2
(45) Date of Patent: May 20, 2008

(54) OPTOELECTRONIC DEVICE

(75) Inventors: Mark Jeffrey Dunn, Ipswich (GB); David John Kenneth Meadowcroft, Stowmarket (GB)

(73) Assignee: Avago Technologies General IP Pte Ltd, Singapore (SG)

( * ) Notice: Subject to any disclaimer, the term of this patent is extended or adjusted under 35 U.S.C. 154(b) by 0 days.

(21) Appl. No.: 11/475,538

(22) Filed: Jun. 27, 2006

(65) Prior Publication Data

US 2007/0009209 A1    Jan. 11, 2007

(30) Foreign Application Priority Data

Jul. 7, 2005    (GB) ................. 0513957.1

(51) Int. Cl.
*G02B 6/36*    (2006.01)
(52) U.S. Cl. ............... 385/91; 385/88; 385/90; 385/92; 385/94
(58) Field of Classification Search ............ None
See application file for complete search history.

(56) References Cited

U.S. PATENT DOCUMENTS

| 4,357,072 | A |  | 11/1982 | Goodfellow et al. ....... 350/96.2 |
|---|---|---|---|---|
| 4,709,979 | A |  | 12/1987 | Spodati et al. ............. 350/96.2 |
| 6,659,659 | B1 | * | 12/2003 | Malone ....................... 385/94 |
| 2005/0053336 | A1 |  | 3/2005 | Ito et al. ........................ 385/89 |
| 2005/0201695 | A1 | * | 9/2005 | Farr ............................. 385/94 |

FOREIGN PATENT DOCUMENTS

GB    2398391    8/2004

* cited by examiner

*Primary Examiner*—Frank G. Font
*Assistant Examiner*—Ryan Lepisto

(57) ABSTRACT

An optoelectronic device having a hermetically sealed optoelectronic component and to a method of forming the device, which may for example be an optical transmitter or receiver device for use in a fiber optic communications network. The optoelectronic device comprises a first sub-assembly and a second sub-assembly, the first sub-assembly comprising at least one optoelectronic component. The optoelectronic component is optically aligned with the at least one optical element along an optical axis to form a housing for the optoelectronic component, the sub-assemblies being joined by at least two joins across the interface including at least one non-hermetic join and separate from the non-hermetic join(s) a hermetic join that extends fully around the optical axis to seal hermetically the optoelectronic component within the housing.

8 Claims, 3 Drawing Sheets

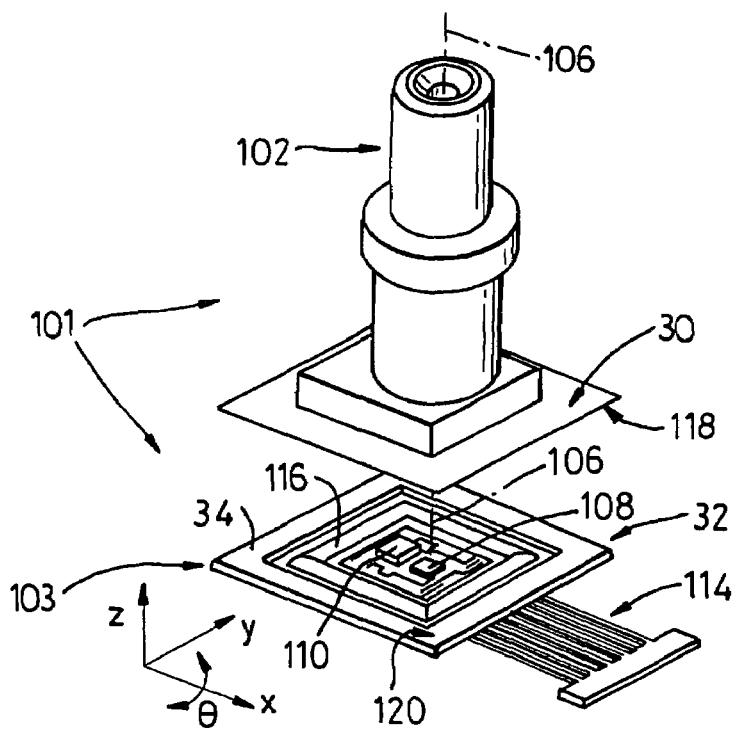
Fig. 3
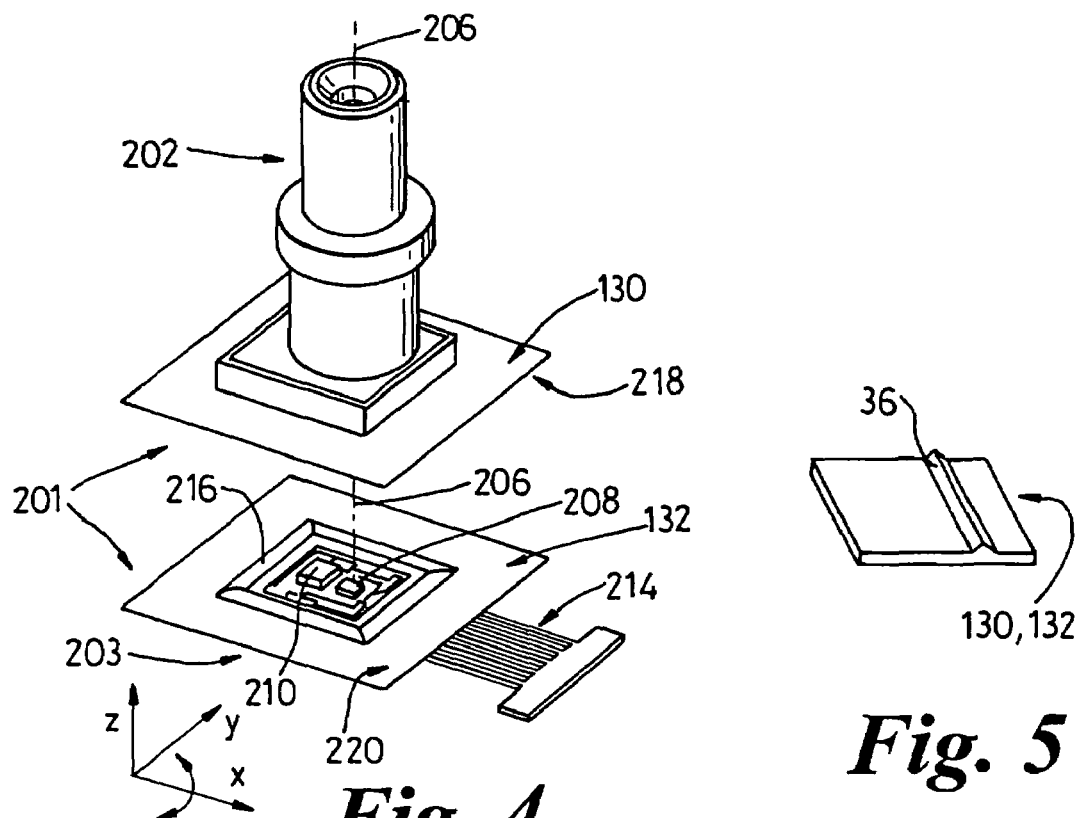
Fig. 4
Fig. 5

OPTOELECTRONIC DEVICE

BACKGROUND a. Field of the Invention

The present invention relates to an optoelectronic device having a hermetically sealed optoelectronic component and to a method of forming the device, for example optical transmitter or receiver device for use in a fibre optic communications network.

b. Related Art

Optoelectronic transmitter or receiver modules, referred to herein individually and in combination as an "optical transceiver module", are often formed from a number of sub-assemblies that need to be optically aligned with respect to each prior to being secured together during manufacture of the device. For example, an optical transceiver module will normally have a sub-assembly that includes a hybrid circuit on a ceramic substrate, including an optoelectronic component such as a photodetector or a laser diode connected to associated electronic circuitry for receiving or transmitting a signal from/to the optoelectronic component. The component may need to be optically aligned with optical elements such as lenses or an optical isolator in another sub-assembly. During manufacture, these sub-assemblies need to be brought together, optically aligned and then secured together. It is sometimes necessary to seal the optoelectronic components within the transceiver module in order to achieve an adequate lifetime for the component in harsh environmental conditions.

In a production environment it can be difficult to maintain alignment and form a hermitic seal at the same time. Usually a hermetic seal can be formed using a welding process, but this requires expensive equipment, which may have to be adapted for reasons of convenience and operator safety so that this can be used in proximity with optical alignment apparatus. Many welding techniques also induce shifts in alignment of the components being welded owing to induced thermal stresses. Because of this, it may be preferable to join components using an adhesive such as an epoxy glue, even though this will not ultimately provide a good hermitic seal in harsh environmental conditions.

It is an object of the present invention to provide a more convenient hermetically sealed optoelectronic device and a process for forming for forming such a hermetically sealed optoelectronic device.

SUMMARY OF THE INVENTION

According to the invention, there is provided an optoelectronic device, comprising a first sub-assembly and a second sub-assembly, the first sub-assembly comprising at least one optical element and the second sub-assembly comprising at least one optoelectronic component, said component being optically aligned with said at least one optical element along an optical axis, the first and second sub-assemblies being joined together along an interface that extends fully around said optical axis to from a housing for said optoelectronic component, said sub-assemblies being joined by at least two joins across said interface including at least one non-hermetic join and separate from said non-hermetic join(s) a hermetic join that extends fully around the optical axis to seal hermitically said optoelectronic component within the housing.

Also according to the invention, there is provided a method of forming an optoelectronic component from a first sub-assembly and a second sub-assembly, the first sub-assembly comprising at least one optical element and the second sub-assembly comprising at least one optoelectronic component, the method comprising the steps of:

i) bringing the first and second sub-assemblies together to form an interface between the sub-assemblies;

ii) optically aligning the component and the optical element along an optical axis;

iii) joining the sub-assemblies together at one or more joins between the interface to secure the optical alignment of the component and the optical element(s), said join(s) not forming a hermetic seal extending fully around the optical axis; and iv) after step iii), joining the sub-assemblies together along a hermetic join that extends fully around the optical axis to seal hermitically said optoelectronic component within a housing thereby formed by the first and second sub-assemblies.

The optoelectronic component may be any type of optoelectronic component, for example a solid-state photodetector or laser diode.

The hermetic join may be formed by any of a number of techniques, depending on the materials used to form the first and second sub-assemblies where these meet at the interface. The interface may be formed by metal surfaces, which have good hermetic properties. Examples of such techniques include welding, brazing or soldering of metal, crimp joining or resistance projection welding of a suitable metal projection extending across the interface.

The non-hermetic join is preferably located within the hermetic seal afforded by the hermitic join. In a preferred embodiment of the invention, that the hermetic join is formed around the non-hermetic join(s). The non-hermetic join can therefore be positioned in such a way that it does not interfere with the formation of the hermetic seal.

The non-hermetic join may extend fully around the optical axis so that the non-hermetic joins lie inside the hermetic seal. In this way, the non-hermetic joins(s) can act to isolate the optoelectronic device from the process used to form the hermetic seal. For example, the non-hermetic join may be one or more areas of an adhesive such as an light curable epoxy resin adhesive. This can be cured to form a barrier around the optical axis, which, while not hermetic, can help protect the optical components and optoelectronic device within the housing from gasses or other contamination that may be created during the formation of the hermetic join.

BRIEF DESCRIPTION OF THE DRAWINGS

The invention will now be further described, by way of example only with reference to the accompanying drawings, in which:

FIGS. 3 is a perspective view of an optoelectronic device according to a first embodiment of the invention similar to that of FIG. 3, but having a pair of laterally extending flanges which are to be joined by an inner non-hermitic join formed with epoxy adhesive and an outer hermetic join formed with solder;

FIG. 4 is a perspective view of an optoelectronic device according to a first embodiment of the invention similar to that of FIG. 3, in which the flanges are to be joined an inner non-hermitic join formed with epoxy adhesive and an outer hermetic join formed with resistance welding;

FIG. 5 is a is a fragmentary cross-section view of a portion of a flange for use with the second embodiment having a profile adapted for making a resistance weld.

DETAILED DESCRIPTION

Figure 1:
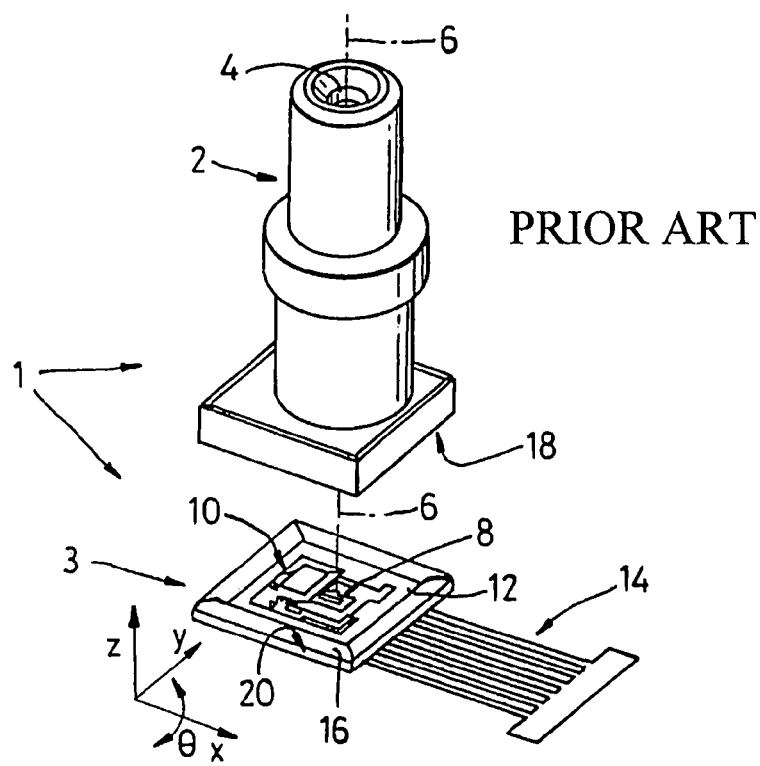
FIGS. 1 and 2 are perspective views of a prior art optoelectronic device, showing how a first sub-assembly having optical components and a second sub-assembly having electronic and optoelectronic devices are aligned and then bonded together with epoxy adhesive.

FIG. 1 shows a prior art optoelectronic device 1 in the process of being assembled from a first sub-assembly 2 and a second sub-assembly 3. The device 1 is an optical receiver device for use in a fibre optic communication system. The first sub-assembly 2 has an optical port 4 into which the fibre optic plug (not shown) can be inserted. Although not shown in the drawing, inside the first sub-assembly 2 are a number of conventional optical components arranged along an optical axis 6 for collecting and receiving optical radiation from the fibre optic connector and for directing this onto a photodetector in the form of a photodiode receiver 8 in the second sub-assembly 3, which when the device 1 is assembled is aligned with the optical axis 6.

The photodiode 8 is connected electrically to other electronic components 10 and together with the electronic components 10 is mounted on a ceramic substrate 12. Electrical connections may be plated on the substrate 12 or be made with wire bonds in a conventional manner. Vias extend through the substrate 12 from which electrical connections 14 can be made externally to the device 1.

Figure 2:
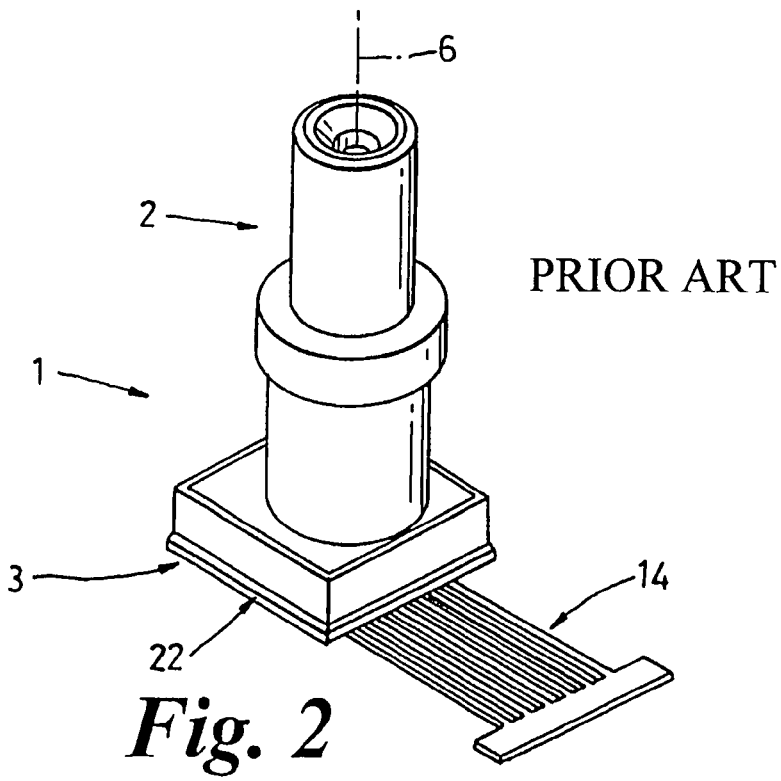

As shown in FIG. 2, the first and second sub-assemblies 2, 3 are brought together in optical alignment along the optical axis 6. In a manufacturing process, it will normally be necessary to align the second sub-assembly 3 with respect to the first sub-assembly 2 along X and Y axes transverse to the optical axis 6 to within a certain tolerance, typically ±5 µm, and possibly also at an optimum position along a Z axis in the direction of the optical axis 6. If the optical device 1 were a transmitter device having a laser diode instead of a receiver device having a photodetector, then it may also be necessary to make a rotational adjustment Θ in the plane of the X and Y axes. This alignment can be made using a test fixture (not shown) in which optical radiation from an optical fibre is introduced into the port 4 while electronic test equipment measures the strength of the signal received by the photodiode 8.

Before the first and second sub-assemblies 2, 3 are brought together and aligned, a bead of epoxy adhesive 16 is applied around a full periphery of one of the sub-assemblies, preferably the second sub-assembly 3. As shown in FIGS. 1 and 2, both of the subassemblies 2, 3 have at one end a matching rectangular profile roughly centred on the optical axis 6. Opposing surfaces 18, 20 of the first and second sub-assemblies 2, 3 form a continuous interface 22 when these are brought together so that the epoxy bead 16 is trapped within and when cured forms a seal in the interface that extends fully around the optical axis 6. Ultraviolet or blue light may be used to cure the epoxy adhesive 16 in order to join the first and second sub-assemblies together. This join forms a good seal, but as is known epoxy adhesives do not form a hermetic seal, It is therefore possible in extreme environments for oxygen or water vapour to be transmitted into the space surrounding the photodiode detector 8 and electronic components 10 which can cause premature failure of the device 1.

FIG. 3 shows an optoelectronic device 101 according to a first embodiment of the invention. For convenience, features in FIG. 3 that correspond with similar features in FIG. 1 are indicated by reference numerals incremented by 100. For example, device 101, similarly to device 1, includes a first sub-assembly 102, a second sub-assembly 103, a photodiode 108, electronic components 110, and electrical connections 114. Device 101 differs from device 1 in a number of respects. Both the first and second subassemblies 102, 103 have a metallic laterally projecting flange 30, 32 that extends transversely to the optical axis 106. Each flange 30, 32 is at a longitudinal end of each sub-assembly 102, 103 so that the flanges 30, 32 present matching inwardly directed surfaces 118, 120 to each other. At least one of the flanges, preferably the flange 32 of the second sub-assembly 103, has around an outer periphery a solder perform 34 to be used in making a hermetic join between the flanges 30, 32. During the manufacture of the device 101 an epoxy bead 116 is applied laterally inside the solder perform 34, preferably in a continuous band that extends fully around the optical axis 106. It may, alternatively, be possible just to apply the adhesive at one or a small number of discrete points. The first and second sub-assemblies 102, 103 can then be brought together and aligned. The correct alignment can then be held in place by curing the epoxy adhesive 116 using blue or UV light as long as there is still a small clearance gap between the flanges 30, 32 in the region of the surrounding solder perform 34.

The cured epoxy adhesive 116 serves two purposes. First, this maintains the alignment until such time as the flanges 30, 32 are heated to melt the solder perform 34, which then makes a hermetic seal extending fully around the interface between the flanges 30, 32. The first and second subassemblies thereby form a hermetic housing for components within the space between the sub-assemblies. Second, the cured epoxy 116, when in the form of a continuous band, prevents solder from flowing towards the photodiode 108 or electronic components 110 and also prevents gases from the soldering process from reaching the photodiode 108 or electronic components 110.

The join afforded by the cured epoxy 116, also permits the formation of the hermetic seal to be made as a different time and on a different production equipment from that used in the alignment process which means that it is not necessary to design a production station that can perform both the alignment and soldering processes, either simultaneously or sequentially.

FIG. 4 shows a second embodiment of an optoelectronic device, i.e., device 201, in which features similar to those of the first embodiment 101 are indicated by reference numerals incremented by 100. For example, device 201, similarly to device 101, includes a first sub-assembly 202, a second sub-assembly 203, a photodiode 208, electronic components 210, and electrical connections 214. Device 201 differs from device 101 in that the flanges 130, 132 are adapted to be joined by means of a resistance welding process, again after curing of an inner band of epoxy adhesive 216. As shown in FIG. 5, one of the flanges 130, 132 has on the inwardly directly surface 218, 220 a raised feature 36 through which electrical current is made to flow between the flanges 130, 132 when these are to be welded together. The raised feature 36, then fuses with the contacting portion of the other flange 130, 132 to form a hermetic seal that extends fully around the interface 222 (see FIG. 6) between the flanges 130, 132.

Figure 6:
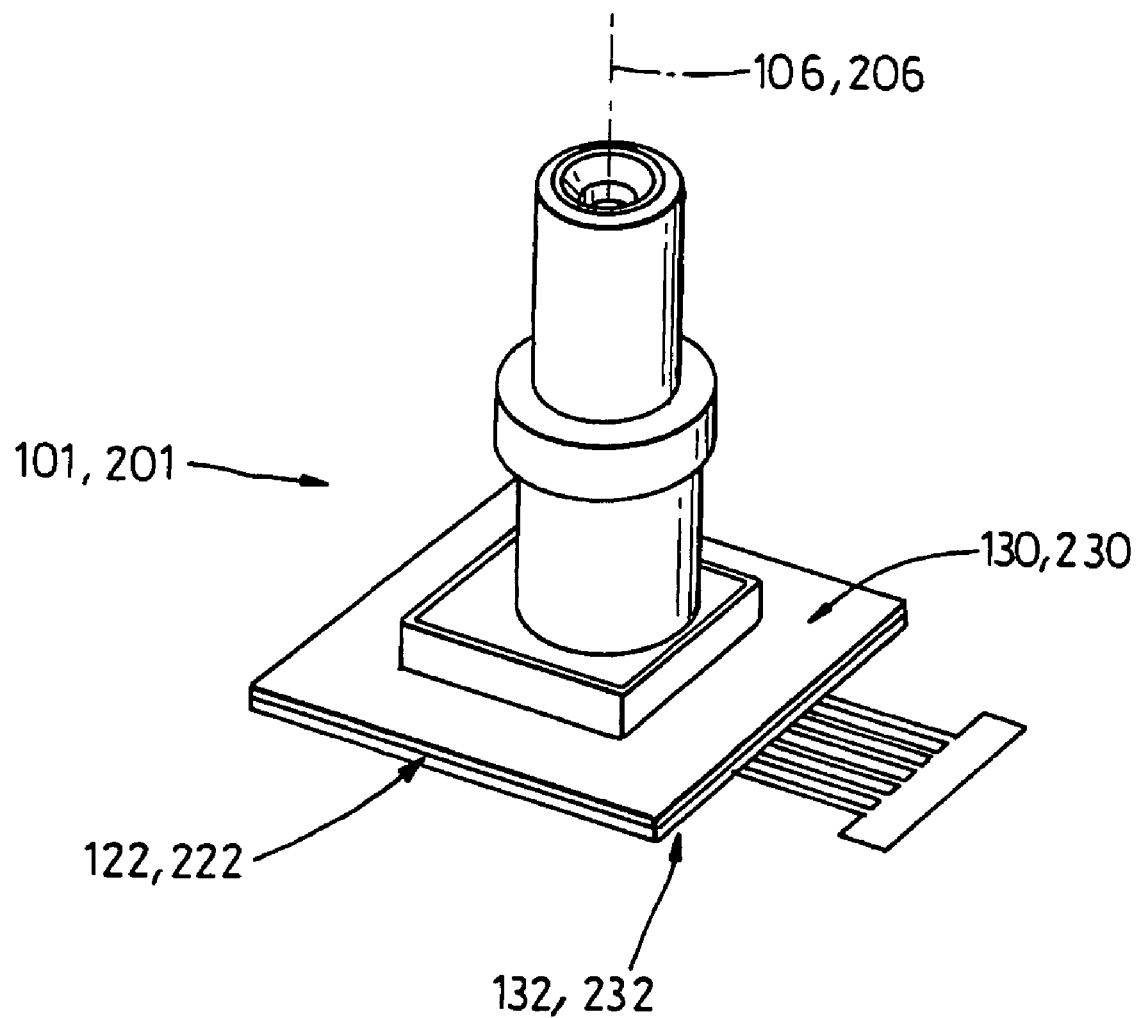
FIG. 6 is a perspective view showing the external appearance of the first and second embodiments of the invention after the first and second sub-components have been joined together.

FIG. 6 shows a fully assembled optoelectronic devices 101, 201 according to the first and second embodiments of the invention. As can be seen, the flanges 130 230, 132, 232 are joined and hermetically sealed about an interface 122, 222 between the flanges. In both devices 101, 201, the interfaces 122, 222 extend transversely to the optical axis 106, 206. It would, however, be possible to orient the interface in another direction, for example parallel to the optical axis, for example by matching cylindrical concentric surfaces. In most cases, however, it would be more convenient if the abutting or nearly abutting surfaces of the first and second subassemblies extend radially away from the optical axis, in order to facilitate alignment in the X and Y directions with respect to the optical axis.

If it is necessary to form an epoxy join having a higher thermal cure than may be achieved by the amount of light present in the interface, then the epoxy may be subject to a secondary thermal cure in order to increase the density of the epoxy bonds.

Although the invention has been described in terms of forming a hermetic seal with a soldered perform or resistance welding, it should be appreciated that any suitable technique for forming a hermetic may be employed, for example also brazing or crimping of a joint between the first and second sub-assemblies.

It is also not necessary that the non-hermetic join be permanent or inside the hermetic join. The non-hermetic join may be provided externally of the hermetic join, for example on a peripheral portion of the interface. This would permit this portion of the interface to be trimmed from the portion containing the hermetic join, which may be useful if it is desired to make the area or dimensions of the hermetic join as small as possible. This would also permit the material forming the non-hermetic portion of the interface to be removed in order to keep the dimensions of the device in this region as small as possible.

It should be understood that although the optical axis has been illustrated as extending perpendicularly to the interface and a long axis of the first sub-assembly, the optical axis is only defined by the passage of optical radiation between the sub-assemblies when these are aligned, so that for other devices within the scope of the invention as defined by the appended claims, the optical axis may extend in any other direction along which optical radiation passes between the first and second sub-assemblies. There may even be more than one such optical axis if light is directed from or to more than one optoelectronic component.

The invention therefore provide a convenient way of forming an optoelectronic device in which first and second sub-assemblies are brought together and then optically aligned and in which a hermetic seal is formed along the joint between the sub-assemblies.

It is to be recognized that various alterations, modifications, and/or additions may be introduced into the constructions and arrangements of parts described above without departing from the scope of the present invention, as defined by the appended claims.

The invention claimed is:

1. An optoelectronic device, comprising:
    a first sub-assembly that includes an optical element and a first surface;
    a second sub-assembly that includes an optoelectronic component that is optically aligned with said optical element along an optical axis and a second surface, wherein said first and second sub-assemblies are joined together along an interface that extends fully around said optical axis, the interface formed by abutting said first surface to said second surface to form a housing for said optoelectronic component;
    a non-hermetic join at said interface; and
    a hermetic join at said interface, separate from said non-hermetic join, wherein said hermetic join extends fully around said optical axis to hermetically seal said optoelectronic component within said housing.

2. The optoelectronic device of claim 1, wherein said hermetic join extends fully around said non-hermetic join.

3. The optoelectronic device of claim 1, wherein said non-hermetic join extends fully around said optical axis.

4. The optoelectronic device of claim 1, wherein said non-hermetic join is formed by an adhesive.

5. The optoelectronic device of claim 1, wherein said first and second surfaces extend transversely to and do not cross said optical axis.

6. The optoelectronic device of claim 5, wherein said first and second surfaces are formed on parallel flanges.

7. A method of forming an optoelectronic component from a first sub-assembly and a second sub-assembly, wherein said first sub-assembly includes an optical element and said second sub-assembly includes an optoelectronic component, said method comprising:
    i) abutting said first and second sub-assemblies together to form an interface between said first and second sub-assemblies;
    ii) optically aligning said optoelectronic component and said optical element along an optical axis to achieve an optical alignment;
    iii) applying a non-hermetic join at said interface to secure said optical alignment; and
    iv) after step iii), applying a hermetic join at said interface, wherein said hermetic join extends fully around said optical axis to hermetically seal said optoelectronic component within a housing thereby formed by said first and second sub-assemblies, said hermetic join forming a perimeter around said non-hermetic join so that said non-hermetic join lies inside said perimeter.

8. The method of claim 7, wherein said non-hermetic join extends fully around said optical axis to isolate said optoelectronic component from said hermetic join.

\* \* \* \* \*